United States Patent
Meeker (10) Patent No.: US 7,573,481 B2
(45) Date of Patent: Aug. 11, 2009

(54) METHOD AND APPARATUS FOR MANAGEMENT OF BIT PLANE RESOURCES

(75) Inventor: Woodrow L. Meeker, Orlando, FL (US)

(73) Assignee: Teranex Systems, Inc., Orlando, FL (US)

( * ) Notice: Subject to any disclaimer, the term of this patent is extended or adjusted under 35 U.S.C. 154(b) by 370 days.

(21) Appl. No.: 11/199,095

(22) Filed: Aug. 8, 2005

(65) Prior Publication Data
US 2006/0092161 A1    May 4, 2006

Related U.S. Application Data

(60) Provisional application No. 60/605,912, filed on Aug. 31, 2004.

(51) Int. Cl.
*G06F 15/80* (2006.01)
*G06F 12/02* (2006.01)

(52) U.S. Cl. ..................... 345/505; 345/543
(58) Field of Classification Search ............... 345/501, 345/505, 543, 568
See application file for complete search history.

(56) References Cited

U.S. PATENT DOCUMENTS

| | | | |
|---|---|---|---|
| 5,519,829 A | 5/1996 | Wilson | |
| 5,923,338 A | 7/1999 | Rich | |
| 6,067,609 A | 5/2000 | Meeker et al. | |
| 6,173,388 B1 * | 1/2001 | Abercrombie et al. | ........ 712/22 |
| 6,185,667 B1 | 2/2001 | Abercrombie et al. | |
| 6,728,862 B1 | 4/2004 | Wilson | |
| 6,728,863 B1 | 4/2004 | Jackson et al. | |

* cited by examiner

*Primary Examiner*—Kee M Tung
*Assistant Examiner*—Jacinta Crawford
(74) *Attorney, Agent, or Firm*—Allen, Dyer, Doppelt, Milbrath & Gilchrist, P.A.

(57) ABSTRACT

System and method for the management of bit plane resources are presented. Because of the scarcity of processing element (PE) memory in a SIMD architecture, it is important to ensure that it is used with optimal efficiency. The Invention discloses methods for managing PE memory at runtime such that nearly 100% utilization is achieved. The method employed allows memory to be allocated and deallocated in single bit plane increments. Runtime allocation and deallocation occurs continuously such that it is impossible to guarantee availability of contiguous blocks of PE memory. The method employed by the invention allows scattered bit planes to be used without the necessity of expending execution time to perform "garbage collection".

26 Claims, 6 Drawing Sheets

Allocation Control 900

| 7:2 | 1 | 0 |
|---|---|---|
| Newsize | Free2 | Free1 |

Event Signals

| Event Bit | Event Description |
|---|---|
| 0 | Bit Pool 0 underflow |
| 1 | Bit Pool 0 overflow |
| 2 | Bit Pool 1 underflow |
| 3 | Bit Pool 1 overflow |
| 4 | |
| 5 | Scoreboard violation: Allocation |
| 6 | Scoreboard violation: Deallocation |

FIG. 11

Audit Signals

| Segment | Audit Signal |
|---|---|
| 0 | Prim_Audit_out[0] |
| 1 | Prim_Audit_out[1] |

FIG. 12

US 7,573,481 B2

METHOD AND APPARATUS FOR MANAGEMENT OF BIT PLANE RESOURCES

CROSS-REFERENCE TO RELATED APPLICATIONS

This application claims the benefit of U.S. Provisional Application No. 60/605,912, filed Aug. 31, 2004, the disclosure of which is hereby incorporated herein in its entirety by reference.

FIELD OF THE INVENTION

This invention relates to SIMD parallel processing, and in particular, to the allocation of bit plane resources.

BACKGROUND OF THE INVENTION

Parallel processing architectures, employing the highest degrees of parallelism, are those following the Single Instruction Multiple Data (SIMD) approach and employing the simplest feasible Processing Element (PE) structure: a single-bit arithmetic processor. While each PE has very low processing throughput, the simplicity of the PE logic supports the construction of processor arrays with a very large number of PEs. Very high processing throughput is achieved by the combination of such a large number of PEs into SIMD processor arrays.

A variant of the bit-serial SIMD architecture is one for which the PEs are connected as a 2-D mesh, with each PE communicating with its 4 neighbors to the immediate north, south, east and west in the array. This 2-d structure is well suited, though not limited to, processing of data that has a 2-d structure, such as image pixel data.

SUMMARY OF THE INVENTION

The present invention in one aspect provides a digital data processing system comprising:
  an array of processing elements, having addressable data storage means, adapted to process bit plane data;
  an allocation table comprising storage means for storing physical addresses;
  means for conveying an image descriptor comprising a virtual address attribute and a size attribute, said virtual address and size specifying the range of the allocation table positions wherein the physical addresses of the bit planes comprising an image are stored.

Further details of different aspects and advantages of the embodiments of the invention will be revealed in the following description along with the accompanying drawings.

BRIEF DESCRIPTION OF THE DRAWINGS

In the accompanying drawings.

DETAILED DESCRIPTION OF THE PREFERRED EMBODIMENTS

The present invention relates to parallel processing of digital data, and in particular, digital image pixel data. Although the embodiments disclosed herein relate to the particular case of image pixel data, it should be understood that pixel data could be replaced with any digital data without departing from the scope and spirit of this invention.

The present invention is part of a parallel processor. The processor comprises an array of processing elements (PEs), sequence control logic, and pixel input/output logic. The architecture is single instruction multiple data (SIMD), wherein a single instruction stream controls execution by all of the PEs, and all PEs execute each instruction simultaneously. The array of PEs is referred to as the SIMD array and the overall parallel processor as the SIMD array processor.

The SIMD array is a mesh-connected array of processing elements. Each processing element (PE) comprises memory, registers and computation logic for processing 1-bit data. In an exemplary embodiment of the invention, the array comprises 48 rows and 64 columns of PEs. The SIMD array constitutes the majority of the SIMD array processor logic, and performs nearly all of the pixel data computations.

Each PE 100 comprises memory, registers and computation logic for processing 1-bit data. Specifically, referring to FIG. 1, the exemplary PE 100 comprises a PE RAM 110, ALU 101, logic blocks A 120, B 130, and registers C 140, D 150, NS 160, EW 170, AL 180, BL 190, and CM 105 for processing 1-bit data.

Figure 1:
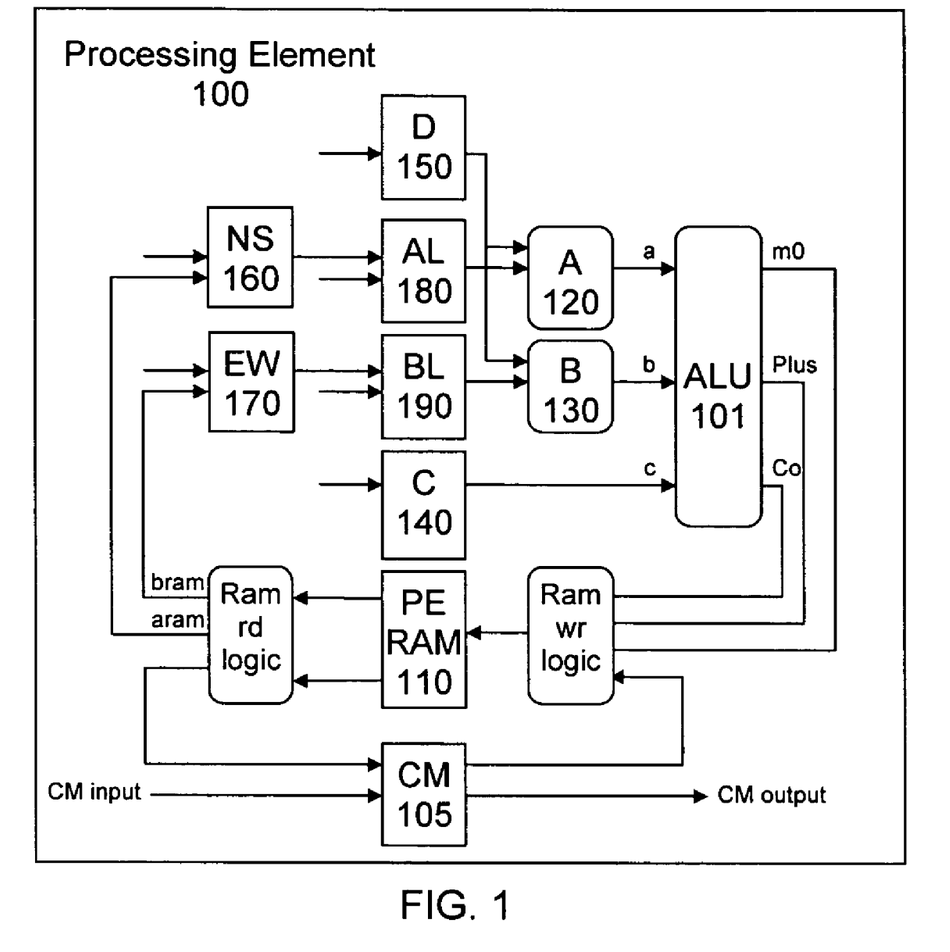
FIG. 1 is a schematic diagram illustrating an exemplary processing element (PE).

PE RAM 110 is effectively 1-bit wide for each PE and stores pixel data for processing by the PE. Multi-bit pixel values are represented by multiple bits stored in the RAM 110. Operations on multi-bit operands are performed by processing the corresponding bits of the operand pixels in turn. In this exemplary embodiment, the RAM 110 provides up to 2 reads and 1 write per cycle. This combination of reads and writes is supported by the use of a "segmented" RAM comprising 2 banks of dual port RAM (1 read, 1 write per bank). The 2 banks are each 128 bits in depth for a total of 256 bits per PE. The segmented RAM approach allows 2 read and 1 write access per cycle whenever the source operands are in opposite segments. In another embodiment, a 3-port RAM of 256 bits depth provides the same accesses regardless of the arrangement of source operands. Other embodiments may employ other multi-access approaches (e.g. 1 read and 1 write) or may provide a single read or write access per cycle.

Figure 2:
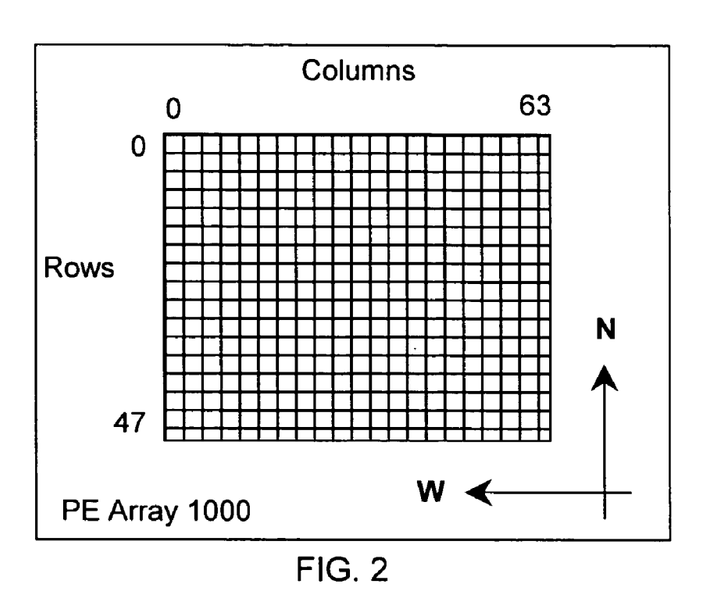
FIG. 2 is a graphical representation of an array of processing elements.

One exemplary PE Array 1000 comprises 48 rows and 64 columns of PEs as shown in FIG. 2. Pixel numbering proceeds from 0,0 at the northwest corner of the array to 47,63 at the southeast corner.

During processing, all PEs of the array perform each operation step simultaneously. Every read or write of an operand bit, every movement of a bit among PE registers, every ALU output is performed simultaneously by every PE of the array. In describing this pattern of operation, it is useful to think of corresponding image bits collectively. An array-sized collection of corresponding image bits is referred to as a "bit plane". From the point of view of the (serial) instruction stream, SIMD array operations are modeled as bit plane operations.

Each instruction in this exemplary embodiment comprises commands to direct the flow or processing of bit planes. A single instruction may contain multiple command fields including 1 for each register resource, 1 for the PE RAM write port, and an additional field to control processing by the ALU 101. This approach is a conventional micro-instruction implementation for an array instruction that provides array control for a single cycle of processing.

Figure 3:
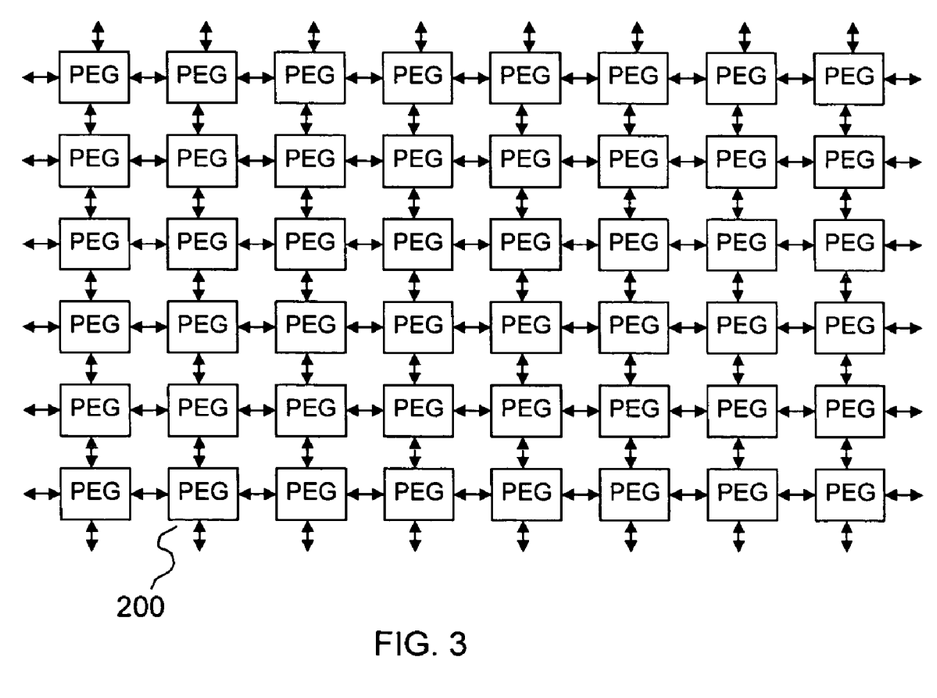
FIG. 3 is a schematic diagram illustrating a PE array composed of processing element groups (PEGs).

The exemplary PE array 1000 is hierarchical in implementation, with PEs partitioned into PE groups (PEGs). Each PEG 200 comprises 64 PEs representing an 8×8 array segment. The 48×64 PE array 1000 is therefore implemented by 6 rows of PEGs, each row having 8 PEGs. Each PEG 200 is coupled to its neighboring PEGs such that PE-to-PE communication is provided across PEG boundaries. This coupling is seamless so that, from the viewpoint of bit plane operations, the PEG partitioning is not visible. It should be noted that these array dimensions are only exemplary and other sizes could be implemented according to the present invention without departing from the scope of this invention.

Figure 4:
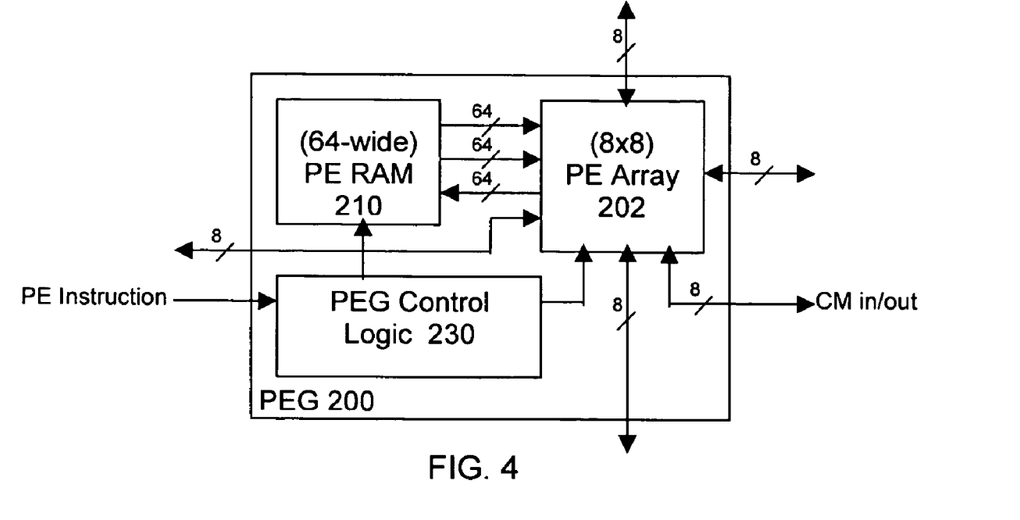
FIG. 4 is a schematic diagram of a PEG.

The exemplary PEG 200 comprises a 64-bit wide multi-access PE RAM 210, PEG control logic 230, and the register and computation logic making up the 64 PEs in PE array 202. Each bit slice of the PE RAM 210 is coupled to one of the 64 PEs, providing an effective 1-bit wide PE RAM 110 for each PE.

In addition to communication with north, south, east and west neighbors, each of the exemplary PEGs includes an 8-bit input and output path for moving pixel data in and out of the PE array 202. The CM register plane provides handling of bit plane data during the input and output. Data is moved in and out of the PE array 1000 in bit plane form.

The PE array described above provides the computation logic for performing operations on pixel data. To perform these operations, the PE array requires a source of instructions and support for moving pixel data in and out of the array.

Figure 5:
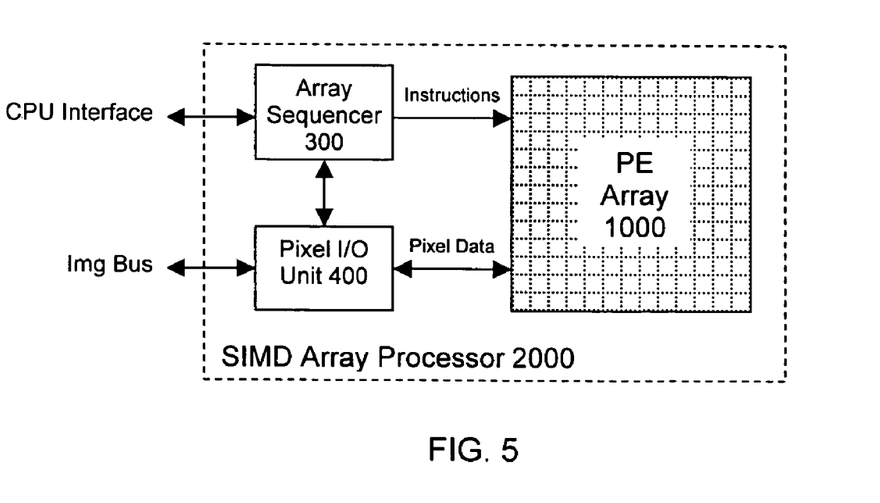
FIG. 5 is a schematic diagram of a SIMD array processor.

An exemplary SIMD array processor 2000 is shown in FIG. 5. The SIMD array processor 2000 includes array sequencer 300 to provide the stream of instructions to the PE array 1000. A pixel I/O unit 400 is also provided for the purpose of controlling the movement of pixel data in and out of the PE array 1000. Collectively, these units comprise a SIMD array processor 2000.

The SIMD array processor 2000 may be employed to perform algorithms on array-sized image segments. This processor might be implemented on an integrated circuit device or as part of a larger system on a single device. In either implementation, the SIMD array processor 2000 is subordinate to a system control processor, referred to herein as the "CPU". An interface between the SIMD array processor 2000 and the CPU provides for initialization and control of the exemplary SIMD array processor 2000 by the CPU.

The pixel I/O unit 400 provides control for moving pixel data between the PE array 1000 and external storage via the image buss called "Img Bus". The movement of pixel data is performed concurrently with PE array computations, thereby providing greater throughput for processing of pixel data. The pixel I/O unit 400 performs a conversion of image data between pixel form and bit plane form. Img Bus data is in pixel form and PE array data is in bit plane form, and the conversion of data between these forms is performed by the pixel I/O unit 400 as part of the I/O process.

The SIMD array processor 2000 processes image data in array-sized segments known as "subframes". In a typical scenario, the image frame to be processed is much larger than the dimensions of the PE array 1000. Processing of the image frame is accomplished by processing subframe image segments in turn until the image frame is fully processed.

Figure 6:
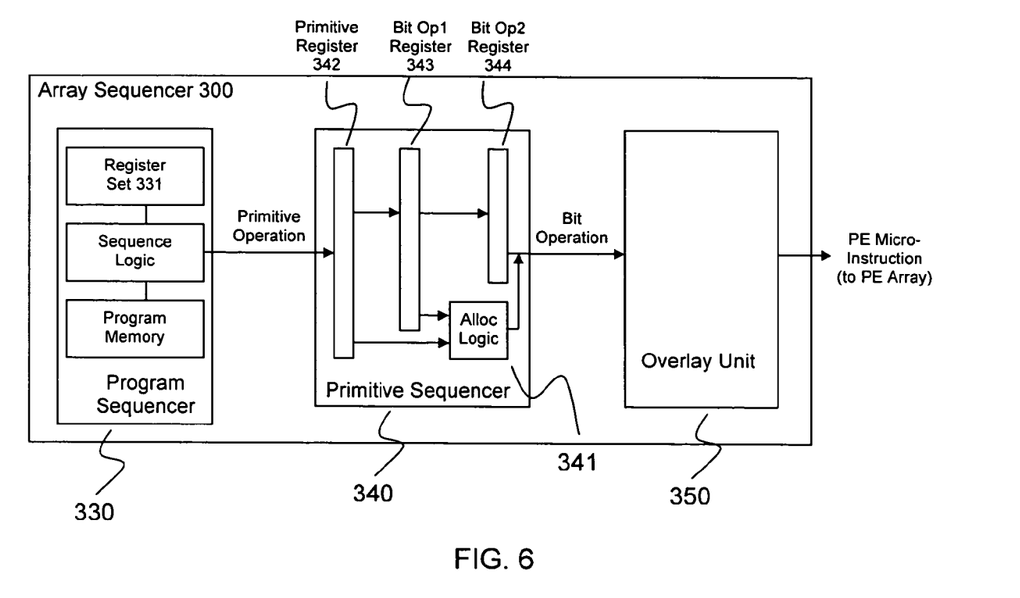
FIG. 6 is a schematic diagram showing the stages of a hierarchical array sequencer.

Control of subframe processing by the PE array 1000 is provided by a hierarchical arrangement of sequencer units (FIG. 6). These units include program sequencer 330 which sequences the application and dispatches image operations (also known as "primitives") to primitive sequencer 340, the primitive sequencer 340 which sequences each primitive operation, dispatching individual bit operations to the overlay unit 350, and the overlay unit 350 which schedules the bit operation microinstruction fields into appropriate pipe stages and resolves any command conflicts. The output of the overlay unit 350 is a stream of microinstructions that provides clock-to-clock control of the PE array for executing subframe operations.

The program sequencer 330 implements a conventional-looking machine language instruction set, provides sequencing control and various support operations for the SIMD core and dispatches instructions in the form of "primitive operations" to the primitive sequencer 340. A primitive operation is one for which a particular microinstruction (or a microinstruction and suitable derivatives) is repeated for a sequence of consecutive memory addresses, i.e. repeated for each operand bit (plane). A basic array operation, such as an image ADD, may be implemented with a single primitive operation.

Figure 7:
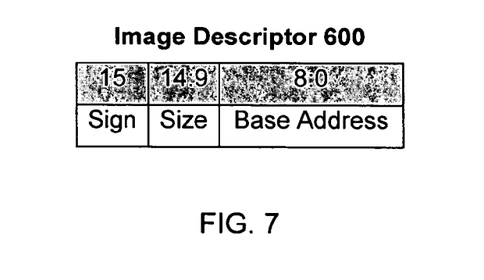
FIG. 7 is a table showing the components of an image descriptor.

The primitive model defines an image operand to be a collection of bit planes beginning at a start address and extending for some defined number of bit planes following the start plane in PE RAM. The number of bit planes comprising the image is known as the image "size". Each image also has a "sign" attribute indicating whether the bit pattern for each pixel value should be interpreted as signed data (sign=1) or unsigned data (sign=0). These attributes are known collectively as an "image descriptor" as shown in FIG. 7. It should be noted that the sizes given in these embodiments are only exemplary and could be scaled to any different size without departing from the scope of the present invention.

Image descriptors are stored (for processing) in a register set within program sequencer 330 and are referred to by register number in the program instruction. Prior to performing an operation on an image operand, it may be necessary to load the operand descriptor to a processor register. Program sequencer 330 dispatches a primitive operation to primitive sequencer 340 by providing the descriptor information for the 3 image operands (2 source, 1 destination) and a 24-bit primitive instruction word to be used by PE array 1000.

The sequencing of a primitive operation by primitive sequencer 340 may be illustrated by the addition of two source operand images with the result stored to a destination operand image. Each of the 3 operands is represented by an image descriptor. The first bit operation adds bit 0 for each source operand, storing the result in bit 0 of the destination operand. The address for each image operand bit plane is derived from the base address values of the corresponding image descriptors. Primitive sequencer 340 dispatches a bit operation comprising the 3 operand bit plane addresses and the 24-bit primitive instruction word to overlay unit 350. As primitive sequencer 340 progresses, the address field of each descriptor is incremented so that the operand addresses for the next bits (bit 1 and so on) are represented in turn. Sequencing of the operation ends when a number of bits corresponding to the destination size have been processed. Where the destination size exceeds a source operand size, the sign attribute of the source descriptor is used to determine whether to sign extend or zero fill for that source operand.

The overlay unit 350 processes bit operations, producing PE microinstruction words to be executed by the array. Bit operations comprise microinstruction commands that must be scheduled within appropriate pipeline slots. Overlay unit 350 performs this scheduling task as well as resolving internal microinstruction conflicts. From overlay unit 350, the PE microinstruction is distributed to the PEGs of the PE array 1000 for execution.

To the programmer, an image is modeled as a consecutive sequence of bit planes in PE RAM. Image descriptor 600 provides a base address and a size attribute implying that the image extends from the base address upward occupying consecutive addresses. In the exemplary embodiment, this is only part of the picture.

Images come and go during algorithm execution such that it is difficult to arrange for maximum PE RAM use without employing garbage collection. The programmer and software tool writer is faced with a choice of inefficiency in PE RAM use (due to the proliferation of unusable small blocks of available memory) or the loss of execution time for the purpose of collecting scattered bit planes into usable image blocks. Since PE RAM and execution time are both precious commodities to the SIMD core programmer, a means for supporting optimal PE RAM use without garbage collection has been incorporated into the SIMD core in the present invention.

Image descriptor 600 includes a 9-bit based address component to describe the base address of the image. The base address value spans a space of 512 bit planes, the lower 256 for PE RAM segment 0 and the upper 256 for segment 1. This is a virtual space, since the physical storage available in the exemplary embodiment is 128 planes of PE RAM for each segment. Within this virtual space, images are represented as consecutive bit plane blocks. Up to 128 locations within each segment of the virtual space may be populated at a given time.

PE RAM planes are allocated to images on an as-needed basis. At a given moment, an image should have allocated to it the minimum number of bit planes required to represent the range of values of the image's pixels. An image that is a destination for an operation will often need a size adjustment to accommodate the result of the operation. This adjustment is accomplished by the specification of a size control value called "Newsize" for the destination operand. Source image operands may also be "Free'd", i.e. deallocated in their entirety. The allocation and deallocation controls are described in more detail later in this disclosure.

Figure 8:
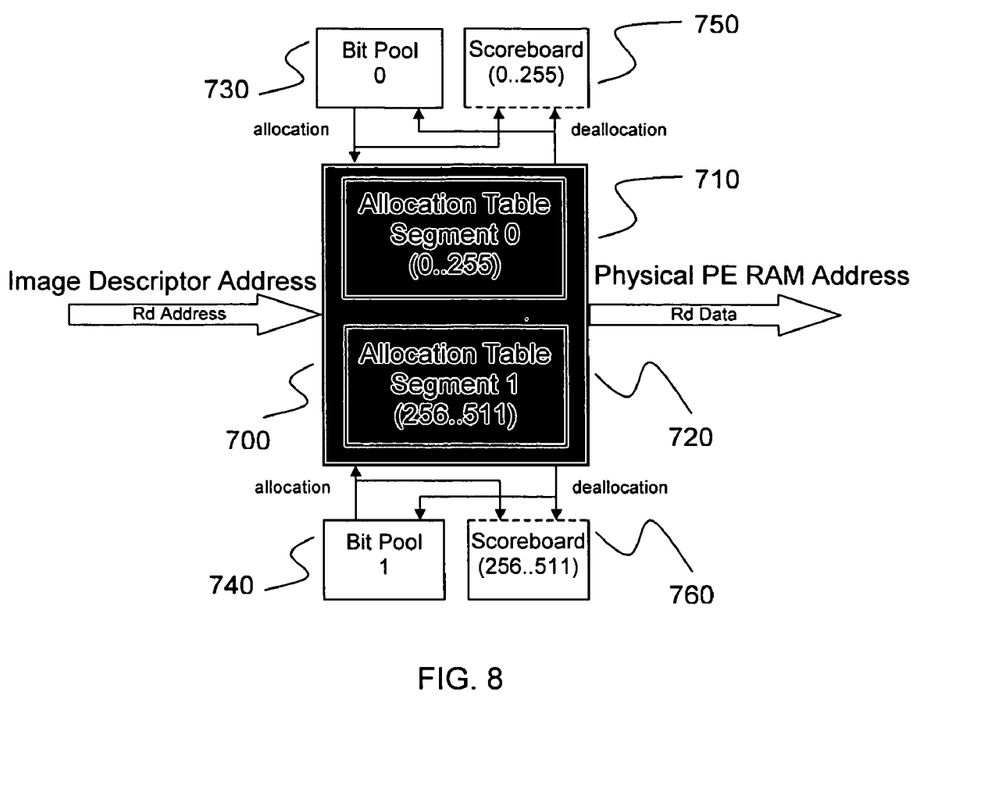
FIG. 8 is a graphical representation of the bit plane management components.

The virtual space is managed by a lookup table, which is allocation table 700 in FIG. 8. In this exemplary embodiment, allocation table 700 is a 512 deep multi-port RAM that provides lookup of a physical PE RAM address for each 9-bit image descriptor base address value. The allocation of a bit plane to an image is accomplished by reading a physical address from a "bit pool" and writing it to the allocation table. To deallocate the bit plane, the address is read from the allocation table 700 and written to the bit pool.

There are 2 bit pools 730 and 740, one for each segment. Each bit pool, in this particular embodiment, is a 128 deep FIFO containing, at any given time, all PE RAM addresses that are available for allocation.

A 512-bit scoreboard register, partitioned into scoreboard 750 and scoreboard 760 as shown in FIG. 8, is used to indicate which of the allocation table locations is populated. The scoreboard is used by primitive sequencer 340 to enforce allocation and deallocation order dependencies and to detect allocation error conditions. Allocation related errors are tracked by an event register to provide a report to the programmer.

Prior to execution of an application, the allocation logic should be in a "clean" state. The bit pools must be initialized with the 256 PE RAM addresses and the scoreboard must be all 0. When these two conditions are met, a "clean" state exists.

Figure 9:
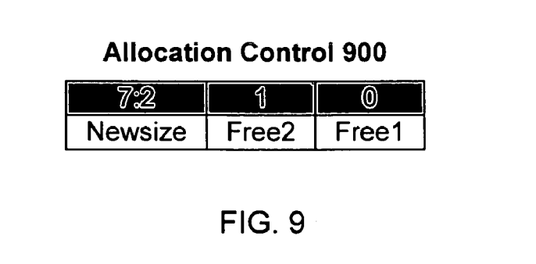
FIG. 9 is a table showing the allocation control signals.

A program sequencer instruction that specifies an array operation identifies 2 source operands and 1 destination operand. The source operands may or may not be image operands, but the destination operand for an array operation must be an image operand. In addition to the operands, the instruction specifies allocation controls as shown in FIG. 9.

The allocation control field of the instruction allows the programmer to directly determine, via Newsize, the size of the destination operand resulting from the execution of the operation. Newsize may cause the destination operand to get larger (incremental allocation), get smaller (incremental deallocation) or remain the same size as the current destination operand.

The Free1 and Free2 controls allow the programmer to specify that the first source operand is to be deallocated (Free1 active) and/or that the second source operand is to be deallocated (Free2 active). The Free controls cause deallocation of the entire corresponding operand image after it is used to perform the array operation.

The management of image storage is directly under the control of the programmer. The programmer determines the span of addresses in allocation table 700 to use for managing an image. The programmer determines when and how this region of the virtual address space will be populated. The programmer does this by generating appropriate image descriptor values to represent the image and through the use of the allocation control fields for operations involving the image.

To better understand further details of the present invention, the following glossary is used:

Free1 and Free2—deallocation control signals for Src1 and Src2 operands

Figure 10:
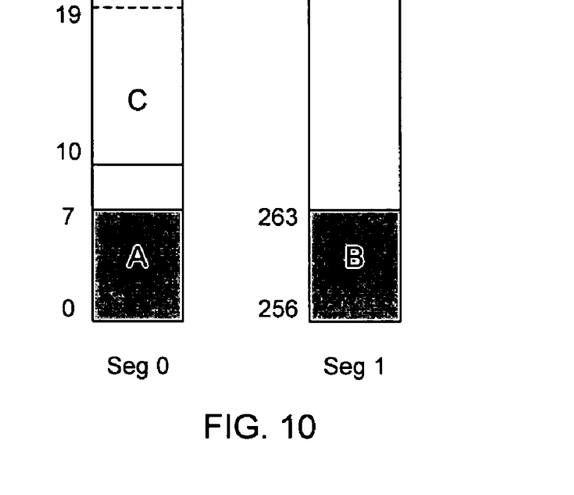
FIG. 10 is a graphical representation of allocated images in the Allocation Table.

Src1 Src2—"Source 1" and "Source 2", the 2 source—or input—operands for an array operation Dest—"Destination" operand—or output—for an array operation Zend—destination base address+Newsize, used during sequencing of multiply to determine when to stop generating bit operations and allocating bit planes Alloc.oldsize_cnt—count down counter, loaded with the original Dest operand size value at the beginning of a primitive Dest_in—signal from the Program Sequencer to the Primitive Sequencer conveying the Dest operand image descriptor Alloc_in—signal from the Program Sequencer to the Primitive Sequencer conveying the Free1, Free2 and Newsize values Alloc_en_reg—register that holds the allocation enable signal Wadr_out—signal from the Primitive Sequencer to the Overlay unit conveying the write address for the bit plane operation Wadr_sel—select signal that selects the source of the Wadr_out value Deall_en_reg—register that holds the deallocation enable signal Alloc.deall_wr0 or Alloc.deall_wr1—write strobes for writing (PUSHing) bit plane addresses to bit pool 0 and bit pool 1 respectively Aadr—PE RAM address field of Bit_Op_Reg1, provides Src1 operand virtual addresses in turn during sequencing Badr—PE RAM address field of Bit_Op_Reg1, provides Src2 operand virtual addresses in turn during sequencing Wadr—PE RAM address field of Bit_Op_Reg1 and Bit_Op_Reg2, provides Dest operand virtual addresses in turn during sequencing Aadr_out—signal from the primitive sequencer to the overlay unit, provides Src1 operand physical address component of bit operation output to overlay Badr_out—signal from the primitive sequencer to the overlay unit, provides Src2 operand physical address component of bit operation output to overlay Wadr_out—signal from the Primitive Sequencer to the overlay unit, provides Dest operand physical address component of bit operation output to overlay Free_1_reg—deallocation task description for Src1 operand; fields of this name are included in both the primitive register and the allocation task register Free_2_reg—deallocation task description for Src2 operand; fields of this name are included in both the primitive register and the allocation task register Free_3_reg—deallocation task description for Dest operand; fields of this name are included in both the primitive register and the allocation task register An example of image storage is shown in FIG. 10. In this example, images A and B are 8-bit images stored in Seg 0 and Seg 1 respectively. Both of these images are fully populated, as indicated by the shading. Assuming A is unsigned and B is signed, the descriptors would be:

$$A=(0<<15)|(8<<9)|0=0\times1000$$

$$B=(1<<15)|(8<<9)|256=0\times9100$$

Now, supposing that A and B are to be ADDed to create image C, some location for C must be chosen. There must be contiguous space large enough to contain the immediate value of C, and preferably large enough to contain all values C might take on during its life span. In the example shown, the programmer selects a block of unused allocation table locations beginning at address 10 and extending for 10 bits to be used by C.

At this point, C is a new image, and is therefore unpopulated (i.e. there are no bit planes allocated to C). Assuming C will be a signed image, the descriptor for C is:

$$C=(1<<15)|(0<<9)|10=0\times800a$$

For this example, the descriptors shown above for A, B and C are the values that must reside in register set 331 in preparations for the operation. The programmer now must decide the size C should take on as a result of the operation. In this example, A and B have differing sign attributes and are both 8 bit in size. Presumably, the result of the operation will be 10 bits to accommodate all possible sums between the pixels of A and B. If the sign attributes were equal, the result size would likely be 9. However, the programmer might opt for an 8-bit result, based on his/her knowledge of the outcome of the operation, or simply a desire to keep the 8 lowest bits of the result. It is up to the programmer to specify the result size for C through the Newsize control.

Assuming that a 10 bit result is desired and no deallocation (Free) of A or B, the allocation control for this operation would be:

$$\text{Allocation Control}=(10<<2)(0<<1)|0=0\times28$$

As a result of this operation, the C image is populated with 10 bit planes. The programmer determined that result by setting Newsize to 10 for the operation. Program sequencer 330 automatically updates the descriptor for C with the new size attribute as a result of the array operation, such that the value of the C descriptor is now:

$$C=(1<<15)|(10<<9)|0=0\times940a$$

In this manner, the programmer adjusts the size of the destination operand for each array operation such that the image is the minimum size needed to store the pixel values of the operation result. The destination operand register is updated with the Newsize so that the programmer need not re-load the descriptor due to its change in value.

In this example, the beginning size of C was 0. In many cases, a destination operand will have a non-zero size, and will be adjusted in size due to an array operation. In all cases, the Newsize control determines the size of the operation result and the size attribute for the destination operand (in the register set 331) is replaced by the Newsize value. If the Newsize is larger than the destination size, an incremental allocation occurs wherein bit planes are allocated to increase the size of the image. If the Newsize is smaller than the destination size, an incremental deallocation occurs wherein bit planes are deallocated to decrease the size of the image.

When an image is no longer needed, it must be deallocated. Deallocation is typically accomplished using the Free1 or Free2 allocation controls. A Free control is applied on the final operation in which an image is accessed. A Free control applies only to source operands. It makes sense that the final access of an image is as a source operand, otherwise the implication is that a value is generated (written) and never used (read). The use of a Free control also helps to ensure that deallocation occurs at the first opportunity, thereby making the deallocated bit planes available as soon as possible.

When applying a Free control, the programmer must ensure that a complete descriptor is employed. It is possible, for example, that the final access of an image might be to a slice of the image rather than to the entire image. If the Free control is applied to an image slice, part of the image will remain allocated. One solution to this is to defer the Free control to a separate operation that is performed specifically to Free the complete image. Another solution is to use the operation to Free the image slice, then generate a descriptor representing the remaining bit planes and perform an operation to Free that portion of the image.

There are several ways to corrupt the state of the image allocation logic. Looking again at the example of FIG. 10, one could consider the case where the image C is unpopulated, but an invalid descriptor containing a size of 10 is used. In this case, Newsize and size match, so no allocation or deallocation will occur. The physical addresses currently in allocation table 700 at 10 through 19 will be used to perform the operation. If these addresses belong to other images, the bit plane data will be corrupted. If the addresses all reside in a bit pool, and if image C is never deallocated, it is conceivable that the programmer will get away with this mistake. Access to unpopulated allocation table addresses is not flagged by the SIMD core.

To continue the example, if the programmer subsequently deallocates image C, the addresses will be sent to the bit pool in error. This might result in duplicate values in the bit pool, leading to cross-talk between images. It might also result in an overflow of the bit pool, since extra addresses have been written to it. Also, the deallocation of unpopulated allocation table locations is detected and flagged as a deallocation conflict.

If an image is Free'd more than once, a deallocation conflict will be generated and a bit pool overflow will likely result eventually due to extra addresses being written to the bit pool. Failing to Free an image will eventually lead to a bit pool underflow as bits continue to be allocated without being replaced. If the allocation table space for the image is reused (i.e. new bit planes allocated to the same space) without deallocation of the image, an allocation conflict event will be generated.

Other circumstances leading to errors could be enumerated. In short, the programmer must ensure that image descriptors do not conflict with the actual status of the allocation table 700. He/she must be certain that allocation table entries are populated prior to being used as source operands and that they are deallocated after final use.

An image belongs to one segment or the other; there is no straddling of the segment boundary in the exemplary embodiment. The high bit (bit 8) of the image descriptor address attribute indicates the segment of the image with respect to allocation table 700 and PE RAM. The allocation table segments are wrapped such that an image block extending beyond the end of a segment is wrapped around to the beginning of the same segment.

Because the initial content of the bit pools is under programmer control, it is possible to incorporate a degree of fault tolerance into the SIMD core. Specifically, if a single PE RAM plane is faulty, it may be isolated by leaving the corresponding bit plane address out of the bit pools altogether. This leaves the programmer with one fewer bit planes, a fact that must be accommodated by the application in question as well as the software tools.

Incremental allocation and deallocation are not performed if the primitive instruction does not specify a write to PE RAM. In other words, where the destination operand is not written, no allocation or deallocation will occur in the exemplary embodiment.

There are physically 256 bit planes of PE RAM for storage of active images in the exemplary embodiment. These 256 bit planes are divided into 128-bit plane segments. The 128 bit planes of each segment are represented by 128 addresses. Addresses that are available for allocation reside in FIFO bit pools. There are 2 bit pools, bit pool 0 (730) and bit pool 1 (740), one for each PE RAM segment. The allocation of a bit plane to an image consists of reading the bit plane address from the appropriate bit pool. For deallocation, the bit plane address is written back to the bit pool.

The mapping of image descriptor bit plane addresses to physical PE RAM addresses is performed by a lookup in allocation table 700. Allocation table 700 is a 5-port RAM (4 read ports, 1 write port) that is 512 deep and 8 bits wide. The image descriptor base address and size attribute describe a range of locations in allocation table 700 that contains the PE RAM addresses for the image operand. As bit planes are allocated to an image, they are written to the corresponding location in allocation table 700. As bit planes are deallocated, they are read from allocation table 700 and written back to the appropriate bit pool. Thus, one of the read ports and the write port of the allocation table are for use during allocation and deallocation of bit planes. The other 3 read ports are used to look up PE RAM addresses for scoreboard 750, scoreboard 760, and destination operands during execution of an operation.

In allocation table 700, segment 0 (710) provides address mapping for PE RAM segment 0, while segment 1 (720) provides mapping for PE RAM segment 1. Images may not straddle segments; each image is stored entirely in one segment.

Allocation table 700 contains twice as many locations as there are bit planes. This allows "holes" in the usage of allocation table locations without any waste of physical bit plane addresses.

It should be noted that the churning of bit plane addresses through the bit pools during execution would cause a great deal of scrambling in the sequence of addresses. Thus, the physical addresses allocated to an image may be a near-random collection of bit planes in PE RAM. This does not matter since the addresses are read from allocation table 700 in turn (i.e. in "virtual" address sequence).

During sequencing of an operation, the Src1, Src2 and Dest operand address fields of primitive register 342 are provided to the fields Aadr, Badr, and Wadr of Bit Op1 register 343. The Aadr, Badr and Wadr fields provide the lookup addresses in the allocation table 700 for the 3 operands. The physical addresses read from the allocation table 700 comprise Aadr_out, Badr_out and Wadr_out outputs to overlay unit 500. Since allocation table 700 is a synchronous RAM, the read provides a single clock delay that synchronizes the address data with the remainder of the bit operation, which is staged through the Bit Op2 register 344.

At startup, the bit pools must be initialized with the physical bit plane addresses. bit pool 0 730 must be loaded with addresses 0..127 and bit pool 1 740 must be loaded with addresses 128..255.

The allocation of bit planes to an image is performed only during the execution of an operation for which the image is a destination operand. Primitive sequencer 340 receives a current size (Dest_in[14:9]) and a new size (Alloc_in[7:2], i.e. Newsize) for the destination operand. If the Newsize value is larger than the current size, a bit plane allocation occurs for each bit plane beyond the current size, thereby adjusting the destination image size to the new size value.

During the load of primitive register 342, the Newsize value is loaded to the primitive register Dest_size field for use in sequencing the primitive. The Dest_in size value is loaded to the Alloc.oldsize_cnt counter. During sequencing of the primitive, the Dest_size and Alloc.oldsize_cnt values are counted down. Once the Alloc.oldsize_cnt value reaches 0, allocation of bit planes begins. While Dest_size continues to count down (and Alloc.oldsize_cnt is 0), bit planes are allocated to the destination operand image.

If the operation is a multiply, allocation is more complex since the operation is multi-pass. The Zend field of the primitive register 342 tracks the allocation of bit planes to the multiply destination operand. Each time a write to the destination operand progresses beyond the Zend value, an allocation is performed and Zend is incremented.

Primitive sequencer 340 requests an allocation by setting the Alloc_en_reg. This register is staged with the Bit Op1 register 343. A bit plane address is read from the appropriate bit pool in response to an active Alloc_en_reg and is written to allocation table 700 at the address indicated by the Wadr field of the Bit Op1 register 343.

If no allocation takes place for a bit operation, the Wadr_out value is read from allocation table 700. However, if an allocation occurs, the new bit plane address comes from a bit pool instead and is provided to Wadr_out in place of the allocation table output. The new bit plane from the bit pool is loaded to the Bit_pool_wadr register so that it is provided in sync with the Bit Op2 register instruction. A field of the Bit Op2 register 344, Wadr_sel, is set in response to the Alloc_en_reg value to provide the appropriate selection between the Bit_pool_wadr value and the allocation table value for computing Wadr_out.

Deallocation of bit planes may occur for any of the operands of an operation. The allocation control 900 includes 2 single bit fields, each of which indicates a "free" or deallocation of a source operand. In addition, an incremental deallocation is indicated if the Newsize value is less than the Dest_in size value. A free of a source operand means deallocation of all bit planes as represented by the source operand descriptor. Incremental deallocation of destination operand bit planes, however, means deallocation of bit planes in excess of the Newsize value.

The deallocation of bit planes is performed concurrently with primitive execution, though unlike allocation, deallocation is not performed as part of the primitive. A separate deallocation sequencer provides sequencing of deallocation tasks. Deallocation tasks are written to an 8 deep FIFO called the deallocation queue. When the deallocation sequencer completes a deallocation task, a new task is read from the deallocation queue.

The process of queuing deallocation tasks begins with the loading of the primitive register (342) Free__1_reg, Free__2_reg and Free__3_reg fields. The Free__1_reg and Free__2_reg registers are loaded with the Src1 and Src2 address and size fields (low 15 bits). The high bit for each of these registers is set when the corresponding allocation control input field (Free1, Free2) is active. A deallocation is indicated for each of these registers only when the high bit is set. The Free__3_reg is set to a task value that represents the incremental deallocation to be performed. If a deallocation is indicated, the upper bit is set, the address field is set to the Dest_in address value plus the Newsize value, and the size field is set to the Dest_in size value minus the Newsize value.

The primitive register Free__1/2/3_reg fields are written to the corresponding Free__1/2/3_reg fields in an allocation task register. This load is done en masse, that is all 3 registers are loaded simultaneously. The load of new tasks from the primitive register 342 to the allocation task register (in alloc logic 341) is permitted only if the current Alloc Free__1/2/3_reg tasks have all been queued. Also, the primitive register Free__1/2/3_reg tasks may not be loaded to the allocation task register until the first bit operation for that primitive operation has been generated (to prevent out-of-order deallocation from occurring).

The deallocation tasks are written to the deallocation queue from the Alloc Free registers. For each Free register having an active most significant bit (MSB), a task is written to the queue. Since there are 3 Free registers, this process may require up to 3 cycles to complete. When a task is written to the queue, the register from which the task was read is cleared in the MSB to indicate that an active task is no longer contained in the register.

If the deallocation queue becomes full, queuing of tasks will be held until the queue is no longer full. If necessary, the sequencing of the primitive will be held to allow queuing to complete so that the primitive register Free field values may be transferred to the Alloc Free registers.

A deallocation task is sequenced by the deallocation sequencer. A deallocation task is represented by a base address and a size. The base address is counted up while the size is counted down. For each count a deallocation is performed.

A bit plane deallocation is requested by setting the Deal_1_en_reg and loading the Deall_addr_reg with the bit plane address for deallocation. Once the size counter (of the deallocation sequencer) reaches 1, a new deallocation task is read from the deallocation queue if one is available. If there is no active deallocation task, no deallocation occurs.

An active Deall_en_reg causes a read of the allocation table 700 at the address provided by Deall_addr_reg. Depending on the segment, Alloc.deall_wr0 or Alloc.deall_wr1 is set to cause the allocation table read data to be pushed to the appropriate FIFO (bit pool 0 (730) or bit pool 1 (740)) on the following cycle.

The allocation and deallocation processes differ in that an allocation task is carried out as part of an operation while a deallocation task is queued for independent sequencing. Because of the queuing of deallocation tasks, it is possible for an allocation to occur out of sequence. Namely, the deallocation of a bit plane could be queued by an operation, and might still be in the queue when the next operation tries to allocate the same bit planes. From the programmer's point of view, the bit planes should be available, but in execution they are not available for some time.

It would be a difficult and unacceptable burden to require the programmer or tool writer to include an analysis of allocation and deallocation traffic to determine when an allocation task can take place. Encapsulation of code sequences in stand alone routines would be nearly impossible since the effects of execution outside of the routine would have to be known for every activation of the routine.

A means for enforcing allocation and deallocation order has been included in primitive sequencer 340. This order enforcement means is the scoreboard which consists of an array of 512 registers, one for each allocation table location. When an allocation occurs, the scoreboard register corresponding to the allocation table address is set. When a deallocation occurs, the scoreboard register is cleared.

If an allocation is requested for an allocation table address and the corresponding scoreboard register is set, and if there are deallocation tasks pending, an out-of-order allocation condition exists. In response to this condition, primitive sequencer 340 holds to allow the pending deallocation task(s) to execute, then proceeds with the operation in which the allocation occurs. If the scoreboard still indicates out-of-order allocation with no deallocation tasks pending, or if the scoreboard indicates out-of-order deallocation, then an allocation error is indicated. In this case, event signals are asserted and execution proceeds.

Figure 11:
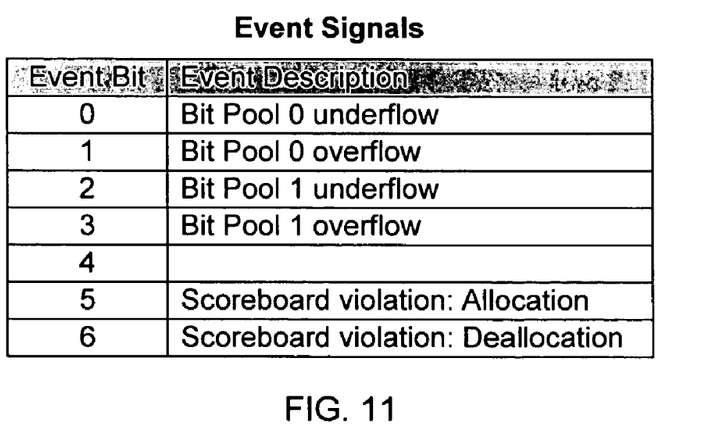
FIG. 11 is a table showing the event signals associated with allocation.

Errors of the kind just described may not be preventable by the primitive sequencer allocation logic 341, but they can at least be detected and propagated as events to be logged in an event register. Primitive sequencer 340 logs 7 events, all but one of which are allocation related. These events are described in FIG. 11.

Figure 12:
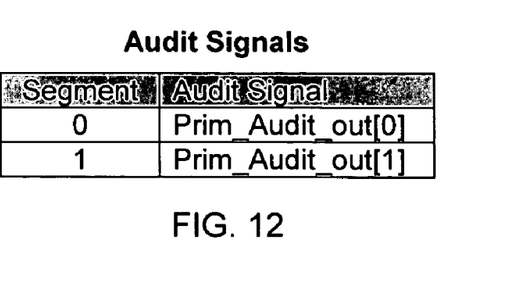
FIG. 12 is a table showing the allocation audit signals generated by the primitive sequencer.

In addition to the events discussed above, 2 audit signals are produced. Each of the audit signals pertains to a segment and is active when the corresponding bit pool is full and the corresponding half of the scoreboard is clear (no allocated bits). These signals are passed to the program sequencer 300, from which they are available via the event register. The audit signals provide a sanity check for the programmer, a way for him/her to check that allocation is "clear" at stopping points in the application where this condition is expected. Unlike the other event signals, the audit signals are not "sticky" in the program sequencer event register, i.e. they are continuously updated and do not necessarily remain asserted once set.

That which is claimed is:

1. A digital data processing system comprising:
   a. an array of processing elements; having addressable data storage means; adapted to process bit plane data;
   b. an allocation table comprising storage means for storing physical addresses;
   c. means for conveying an image descriptor comprising a virtual address attribute and a size attribute, the virtual address and size attributes specifying the range of the allocation table positions, wherein the physical addresses of the bit planes comprising an image are stored; and
   d. a sequencer configured to control processing of bit planes in the processor array, the sequencer generating at least one microinstruction in response to at least one image descriptor, the image descriptor representing a processor array image operand, the at least one microinstruction comprising one microinstruction for each bit plane of the image operand, each of the microinstructions comprising a physical address, wherein the physical address is generated by reading the allocation table at a generated virtual address, the generated virtual address being computed by increasing the virtual address attribute of the image descriptor by a count of 1 for each generated microinstruction.

2. The system of claim 1, wherein the number of storage positions in the allocation table exceeds the number of bit planes comprising the processing array.

3. The system of claim 1, wherein the image descriptor further comprises a sign attribute to indicate whether the image is to be processed as signed data.

4. The system of claim 1, wherein the allocation table is configured to provide multiple simultaneous accesses.

5. The system of claim 1, wherein the array is partitioned into multiple segments, each segment comprising a number of bit planes, and wherein the allocation table is partitioned into corresponding segments, each allocation table segment comprising storage means for storing physical addresses pertaining to one of the array segments.

6. The system of claim 1, further providing first allocation means for allocating bit planes to an image, the first allocation means comprising a repository of physical addresses representing available bit planes, and wherein the allocation includes reading a physical address from the repository and writing the physical address to the allocation table.

7. The system of claim 6, wherein the repository is a FIFO memory.

8. The system of claim 6, wherein the processing array is partitioned into multiple segments, each segment comprising a number of bit planes, and wherein the repository is partitioned into corresponding segments, each repository segment comprising storage means for storing physical addresses of one of the array segments.

9. The system of claim 6, further comprising second allocation means for allocating bit planes to an unpopulated image, the image having no bit planes allocated to it, and the second allocation means performing the allocation in response to an image descriptor wherein the size attribute is 0 and further responding to a size control signal the size control signal indicating the number of bit planes to allocate.

10. The system of claim 6, further comprising third allocation means for allocating bit planes to a partially populated image, the image having a number of bit planes allocated to it, and the third allocation means performing the allocation in response to an image descriptor, and further responding to a size control signal, and allocating an additional number of bit planes such that the image is populated with the number of bit planes indicated by a size control signal.

11. The system of claim 6, further comprising a scoreboard, the scoreboard comprising an array of registers equal in number to the number of allocation table positions, wherein each register is adapted to indicate whether the corresponding allocation table position is populated.

12. The system of claim 11, further comprising detecting means for detecting the condition wherein an allocation is attempted for an allocation table position that is populated, and generating a signal to indicate the condition, and further including response means for responding to the signal to prevent the allocation until the condition is no longer detected.

13. The system of claim 11, further comprising detecting means for detecting the condition wherein an allocation is attempted for an allocation table position that is populated, and generating a signal to indicate the condition, and further including means for setting an event register in response to the signal.

14. The system of claim 11, wherein the allocation table is partitioned into multiple segments, each segment comprising a number of storage positions, and wherein the scoreboard is partitioned into corresponding segments, each scoreboard segment comprising an array of registers adapted to indicate allocation status for positions within the corresponding segment of the allocation table.

15. The system of claim 1, further providing first deallocating means for deallocating bit planes of an image, the first deallocating means comprising a repository of physical addresses representing available bit planes, and wherein the deallocation includes reading a physical address from the allocation table and writing the physical address to the repository.

16. The system of claim 15, wherein the repository is a FIFO memory.

17. The system of claim 15, wherein the processing array is partitioned into multiple segments, each segment comprising a number of bit planes, and wherein the repository is partitioned into corresponding segments, each repository segment comprising storage means for storing physical addresses of one of the array segments.

18. The system of claim 15, further comprising second deallocating means for deallocating bit planes of a populated image, the second deallocating means performing the deallocation in response to an image descriptor, and further responding to a free control signal, the free control signal indicating that all bit planes of the image are to be deallocated.

19. The system of claim 15, further comprising third deallocating means for deallocating bit planes of a populated image, the third deallocating means performing the deallocation in response to an image descriptor, and further responding to a size control signal, and deallocating a number of bit planes such that the image is populated with the number of bit planes.

20. The system of claim 15, further comprising a scoreboard, the scoreboard comprising an array of registers equal in number to the number of allocation table positions, wherein each register is adapted to indicate whether the corresponding allocation table position is populated.

21. The system of claim 20, further comprising detecting means for detecting the condition wherein a deallocation is attempted for an allocation table position that is unpopulated, and generating a signal to indicate the condition, and further including response means for responding to the signal to prevent the deallocation until the condition is no longer detected.

22. The system of claim 20, further comprising detecting means for detecting the condition wherein a deallocation is attempted for an allocation table position that is unpopulated, and generating a signal to indicate the condition, and further including means for setting an event register in response to the signal.

23. The system of claim 20, wherein the allocation table is partitioned into multiple segments, each segment comprising a number of storage positions, and wherein the scoreboard is partitioned into corresponding segments, each scoreboard segment comprising an array of registers adapted to indicate allocation status for positions within the corresponding segment of the allocation table.

24. The system of claim 1, further comprising processing means for processing an instruction, the instruction comprising at least one image descriptor, and further comprising a size control to determine the number of bit planes with which an image is to be populated as a result of processing the instruction.

25. The system of claim 24, further comprising replacing means for replacing the size attribute with the value of the size control in a stored copy of the image descriptor.

26. The system of claim 1, further comprising processing means for processing an instruction, the instruction comprising at least one image descriptor, and further comprising at least one free control to determine that all bit planes with which an image is populated are to be deallocated as a result of processing the instruction.

* * * * *